(12) United States Patent
McGuffin et al.

(10) Patent No.: US 8,571,586 B2
(45) Date of Patent: Oct. 29, 2013

(54) METHOD FOR AUTOMATIC STANDBY RESPONSE TO REDUCE PILOT WORKLOAD

(75) Inventors: Thomas F. McGuffin, Bellevue, WA (US); Tom Judd, Woodinville, WA (US)

(73) Assignee: Honeywell International Inc., Morristown, NJ (US)

( * ) Notice: Subject to any disclaimer, the term of this patent is extended or adjusted under 35 U.S.C. 154(b) by 767 days.

(21) Appl. No.: 12/686,708

(22) Filed: Jan. 13, 2010

(65) Prior Publication Data

US 2010/0277292 A1 Nov. 4, 2010

Related U.S. Application Data

(63) Continuation-in-part of application No. 11/765,157, filed on Jun. 19, 2007.

(51) Int. Cl.
*H04W 4/00* (2009.01)
*G08B 1/00* (2006.01)
*G08B 21/00* (2006.01)

(52) U.S. Cl.
USPC ......... 455/466; 340/309.9; 340/945; 455/431

(58) Field of Classification Search
USPC ................ 455/466, 431, 412.1, 412.2; 340/946–983; 709/206, 207; 379/93, 379/24, 100, 8; 358/402
See application file for complete search history.

(56) References Cited

U.S. PATENT DOCUMENTS 5,003,619 A * 3/1991 Morris et al. .......... 455/69
6,085,145 A 7/2000 Taka et al.
6,175,314 B1 1/2001 Cobley
6,181,260 B1 1/2001 Simon et al.
6,195,609 B1 2/2001 Pilley et al.

(Continued)

FOREIGN PATENT DOCUMENTS

EP 2012493 1/2009
WO 2006087276 8/2006
WO 2007064734 6/2007

OTHER PUBLICATIONS

Eurocontrol, "Cascade Applications—Information Paper", Nov. 3, 2004, pp. 1-15, Publisher: Aeronautical Communications Panel (ACP)—Working Group N (Networking), Published in: New Orleans, US.

(Continued)

*Primary Examiner* — Kent Chang
*Assistant Examiner* — Chayce Bibbee
(74) *Attorney, Agent, or Firm* — Fogg & Powers LLC (57) ABSTRACT

A method of communication comprises receiving a text message, starting a response timer, and monitoring transmission of a response message. If the response message has not been transmitted, it is determined whether the response timer has reached a timing threshold. If not, monitoring for transmission of the response message continues. If the response timer reaches the timing threshold without the response message being sent, it is determined whether an automatic standby message mode is enabled. If the automatic standby message mode is enabled, a STANDBY message is automatically transmitted and the response timer is restarted. Monitoring for response message transmission then continues. If a response message has not been transmitted, it is determined whether the response timer expired. If response timer has not expired, then monitoring response message transmission continues. If the response timer has expired without the response message being sent, transmission of subsequent response messages is disabled.

20 Claims, 5 Drawing Sheets

(56) References Cited

U.S. PATENT DOCUMENTS

| | | | |
|---|---|---|---|
| 6,282,417 B1 | 8/2001 | Ward | |
| 6,313,759 B1 | 11/2001 | Musland-Sipper | |
| 6,608,559 B1 | 8/2003 | Lemelson et al. | |
| 2003/0006910 A1* | 1/2003 | Dame | 340/945 |
| 2003/0153263 A1 | 8/2003 | Glass | |
| 2004/0124998 A1 | 7/2004 | Dame | |
| 2004/0132452 A1* | 7/2004 | Lee | 455/445 |
| 2008/0114504 A1 | 5/2008 | Goodman et al. | |
| 2008/0154486 A1 | 6/2008 | Coulmeau | |
| 2008/0163093 A1 | 7/2008 | Lorido | |
| 2008/0316057 A1 | 12/2008 | McGuffin | |
| 2010/0188266 A1 | 7/2010 | Judd et al. | |
| 2010/0277347 A1 | 11/2010 | Judd | |

OTHER PUBLICATIONS

Asbury, M.J.A., "Integration of ADS and CPDLC in the NAT Region—Integrated Scenarios", "Aeronautical Telecommunications Network Panel, Working Group 3 Meeting", Mar. 4, 1997, Published in: Phuket, Thailand.

"Interoperability Requirements Standard for Aeronautical Telecommunication Network Baseline 1 (ATN B1 Interop Standard)", Jun. 26, 2007, pp. 101-107, vol. 1, Publisher: RTCA, Incorporated, Published in: Washington, DC.

European Patent Office, "Office Action", Apr. 13, 2001, 7 pages, Published in: EP.

European Patent Office, "European Search Report", mailed Apr. 6, 2011, 3 pages, Published in: EP.

U.S. Patent and Trademark Office, "Advisory Action", "U.S. Appl. No. 11/765,157", Feb. 15, 2011.

U.S. Patent and Trademark Office, "Final Office Action", "U.S. Appl. No. 11/765,157", Jul. 6, 2012.

U.S. Patent and Trademark Office, "Office Action", "U.S. Appl. No. 12/434,763", Sep. 30, 2011.

European Patent Office, "European Search Report", from foreign counterpart of U.S. Appl. No. 12/358,918, mailed May 25, 2010, Published in: EP.

U.S. Patent and Trademark Office, "Final Office Action", "U.S. Appl. No. 11/765,157", Nov. 29, 2011.

U.S. Patent and Trademark Office, "Office Action", "U.S. Appl. No. 12/358,918", Sep. 26, 2011.

U.S. Patent and Trademark Office, "Office Action", "U.S. Appl. No. 12/358,918", Apr. 27, 2012.

U.S. Patent and Trademark Office, "Office Action", "U.S. Appl. No. 11/765,157", May 19, 2010.

U.S. Patent and Trademark Office, "Office Action", "U.S. Appl. No. 11/765,157", Nov. 25, 2011.

U.S. Patent and Trademark Office, "Office Action", "U.S. Appl. No. 12/434,763", May 25, 2012.

European Patent Office, "Office Action", from foreign counterpart of U.S. Appl. No. 11/765,157, Apr. 29, 2009, Published in: EP.

European Patent Office, "European Search Report", from foreign counterpart of U.S. Appl. No. 11/765,157, mailed Feb. 19, 2009, Published in: EP.

European Patent Office, "European Search Report", from foreign counterpart of U.S. Appl. No. 11/765,157, mailed Dec. 4, 2008, Published in: EP.

European Patent Office, "European Search Report", from foreign counterpart of U.S. Appl. No. 12/434,763, mailed Jul. 8, 2010, Published in: EP.

European Patent Office, "Office Action", from foreign counterpart of U.S. Appl. No. 12/434,763, mailed Jul. 22, 2010, Published in: EP.

U.S. Patent and Trademark Office, "Notice of Allowance", "U.S. Appl. No. 12/358,918", Aug. 3, 2012.

European Patent Office, "Communication under Rule 71(3) EPC" foreign counterpart of U.S. Appl. No. 12/686,708, Jul. 19, 2012,.

European Patent Office, "Communication under Rule 71(3) EPC" from foreign counterpart of U.S. Appl. No. 11/765,157, Jan. 8, 2010.

European Patent Office, "Communication under Rule 71(3) EPC" from foreign counterpart of U.S. Appl. No. 12/358,918, Mar. 14, 2011,.

* cited by examiner

METHOD FOR AUTOMATIC STANDBY RESPONSE TO REDUCE PILOT WORKLOAD

CROSS REFERENCE TO RELATED CASES

This application is a continuation-in-part of application Ser. No. 11/765,157 filed Jun. 19, 2007, entitled METHOD FOR AUTOMATED STANDBY MESSAGE RESPONSE TO REDUCE PILOT AND AIR TRAFFIC CONTROLLER WORKLOAD (pending), and which application is incorporated herein by reference.

BACKGROUND

Air traffic control (ATC) centers are used at most airports to coordinate take-offs, landings, and general aircraft traffic around the airport. Traditionally, a pilot uses a radio to speak to an ATC center to request permission or to receive instructions therefrom. With increasing air traffic it has become difficult for ATC centers to process all of the oral communications from aircraft. Consequently, data-link applications have been developed to provide textual communication between pilots and air traffic controllers.

One of these data-link applications, called Controller Pilot Data Link Communication (CPDLC), provides for the direct exchange of text-based messages between a controller and a pilot. The CPDLC enables the pilot to communicate electronically with an ATC center by guiding the pilot through a series of screen configurations or displays that either elicit flight information from the pilot or notify the pilot regarding flight information. The CPDLC may be part of a larger flight information/control program or may serve as a stand-alone program.

The CPDLC protocol as defined in Eurocae document ED110/RTCA doc 280 requires the pilot to respond to each ground message within 100 seconds. If the pilot needs more time then the pilot has to manually send a "STANDBY" message. The pilot then has 100 more seconds to respond from the time the STANDBY message was sent. If the pilot sends the STANDBY message shortly after receiving the ground message, say 20 seconds, then that does not maximize the amount of time to respond (20 s+100 s=120 s). The pilot can wait and try to send the STANDBY message just before the 100 second time limit expires in order to maximize the time to evaluate the message (e.g., 99 s+100 s=199 s). If the pilot is busy and really needs more time to respond, then the last thing the pilot needs is another task to perform. The air traffic controller is in a similar high pressure situation but with a different time limit of 240 seconds to respond to an aircraft message.

SUMMARY

A method for communicating an automatic standby message in response to an electronic text message in a network is provided. The method comprises receiving a text message, starting a response timer for a time period to respond, and monitoring whether a response message has been transmitted. If the response message has not been transmitted, a determination is made whether the response timer has reached a predetermined timing threshold. If the response timer has not reached the predetermined timing threshold, then the method continues to monitor whether the response message has been transmitted. If the response timer has reached the predetermined timing threshold without the response message being sent, a determination is made whether an automatic standby message mode is enabled. If the automatic standby message mode is enabled, a STANDBY message is transmitted automatically and the response timer is restarted for the time period to respond. The method then monitors whether the response message has been transmitted. If the response message has not been transmitted, a determination is made whether the response timer has expired. If the response timer has not expired, then the method continues to monitor whether the response has been transmitted. If the response timer has expired without the response message being sent, the method disables any subsequent response message to the text message from being sent.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention is related to a method for sending an automated STANDBY message response in order to reduce pilot and air traffic controller workload. The present method automatically maximizes the total time allowed to respond to a Controller Pilot Data Link Communication (CPDLC) message. In general, if a pilot has not responded to a CPDLC message within a specified time period, then the avionics software automatically sends a STANDBY message to the air traffic controller. The pilot's workload is reduced and the pilot automatically gets additional time to respond. Likewise, if the air traffic controller has not responded to a CPDLC message within a specified time, then the controller workstation software automatically sends a STANDBY message to the pilot. The air traffic controller's workload is thereby reduced and the controller automatically gets extra time to respond to the pilot.

The present method can be implemented for an aircraft by modifying conventional avionics software to add logic steps to detect when a specified time period has elapsed since an uplink CPDLC message was received without a pilot initiated response, and then automatically send a downlink STANDBY message to the air traffic controller. If the pilot responds before the time period has elapsed, then a STANDBY message is not sent.

The present method can be implemented for an air traffic control system on the ground by modifying the air traffic controller workstation software to add logic steps to detect when a specified time period has elapsed since a downlink CPDLC message was received without a controller initiated response, and then automatically send an uplink STANDBY message to the aircraft. If the controller responds before the time period has elapsed, then a STANDBY message is not sent.

It should be noted that the ground and avionics implementations of the present method utilize the same unique features but are independent of each other. Thus, the present method can function even if only one of the aircraft or the air traffic control system has been implemented with software for automatically sending a STANDBY message.

Figure 1:
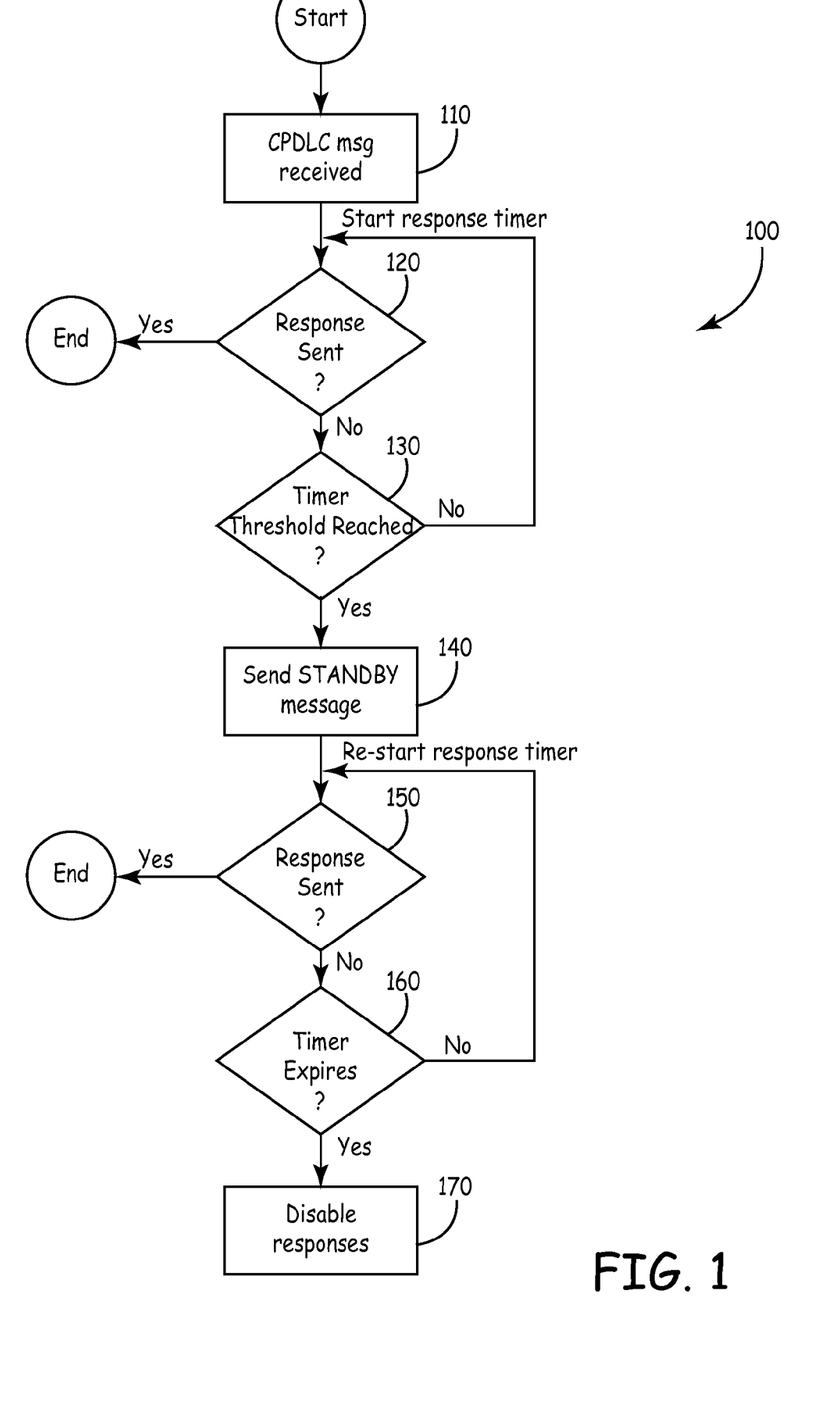
FIG. 1 is a flow diagram representing a method for automatically sending a STANDBY message response according to one aspect of the invention.

FIG. 1 is a flow diagram representing a method 100 for communicating an automatic standby message in response to an electronic text message in a network. The method starts when a text message such as a CPDLC message is received by a pilot or an air traffic controller (block 110). A response timer is then started for a first time period and a determination is made whether the pilot/controller has sent a response message (block 120). If the response message has been sent, the method ends. If the response message has not been sent, a determination is made whether the response timer has reached a predetermined timing threshold (e.g., 90% of time elapsed) (block 130). If not, method 100 continues to monitor whether a pilot/controller response message has been sent and whether the response timer has reached the threshold. When the timer reaches the predetermined timing threshold with the response message still not sent, an automatic STANDBY message is transmitted (block 140) and the response timer is re-started for a second time period. A determination is then subsequently made whether the pilot/controller has sent the response message (block 150) during the second time period. If the response message has been sent during the second time period, the method ends. If the response message has not been sent during the second time period, a determination is made whether the timer has expired (block 160). If not, method 100 continues to monitor whether a pilot/controller response message has been sent and whether the response timer has expired. If the response timer expires without the response message being sent, any subsequent response message is disabled (block 170).

Figure 2:
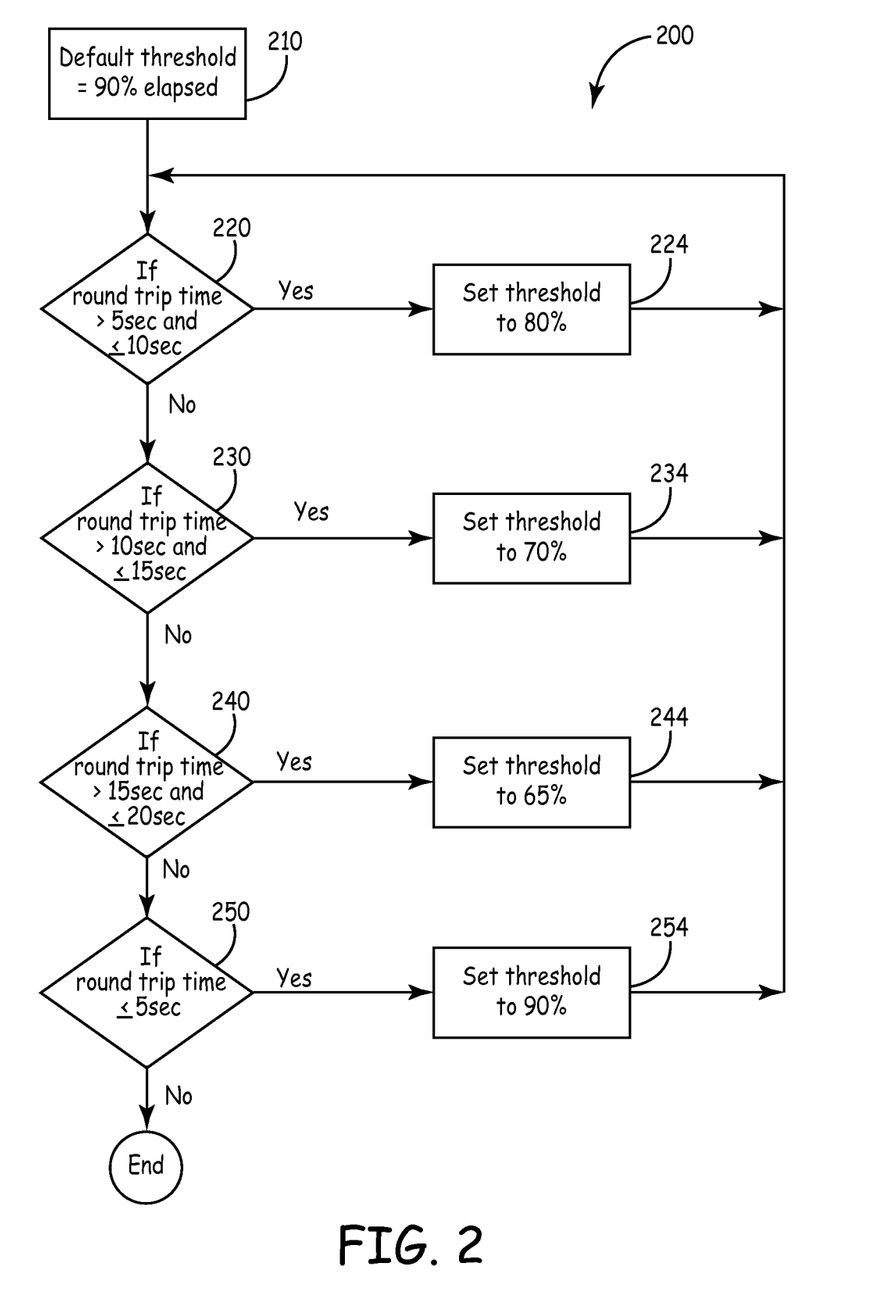
FIG. 2 is a flow diagram representing a method for varying a timing threshold for automatically sending the STANDBY message response according to FIG. 1.

It should be noted that the predetermined timing threshold utilized in method 100 can be automatically varied as a function of network performance such as network response time. FIG. 2 is a flow diagram representing an exemplary method 200 for automatically varying the timing threshold for transmitting the automatic STANDBY message based on the timing of a round trip message between a sender computer and a receiver computer. The round trip message time is the difference between the time of message transmission and the time of reception of an automatic acknowledgment from the receiver computer. In general, as network signal propagation delays become greater, the default timing threshold is reduced so that the automatic STANDBY message is transmitted earlier.

As shown in FIG. 2, a timing threshold having a default value such as about 90% time elapsed is set (block 210), and a round trip message time is monitored. A determination is then made whether the round trip message time is within a first range, such as from greater than about 5 seconds up to about 10 seconds (block 220). If yes, then the threshold is set to a first value that is less than the default value, such as about 80% time elapsed (block 224), and the method continues to monitor the round trip message time; if no, a determination is then made whether the round trip message time is within a second range, such as from greater than about 10 seconds up to about 15 seconds (block 230). If yes, then the threshold is set to a second value that is less than the first value, such as about 70% time elapsed (block 234), and the method continues to monitor the round trip message time; if no, a determination is then made whether the round trip message time is within a third range, such as from greater than about 15 seconds up to about 20 seconds (block 240). If yes, then the threshold is set to a third value that is less than the second value, such as about 65% time elapsed (block 244), and the method continues to monitor the round trip message time; if no, a determination is then made whether the round trip message time is within a fourth range, such as about 5 seconds or less (block 250). If yes, then the threshold is set back to the default value such as about 90% (block 254), and the method continues to monitor the round trip message time. If the round trip message time is not within any of the foregoing decision blocks (e.g., greater than about 20 seconds), the method 200 ends and other message timing controls in the computer take over.

Figure 3:
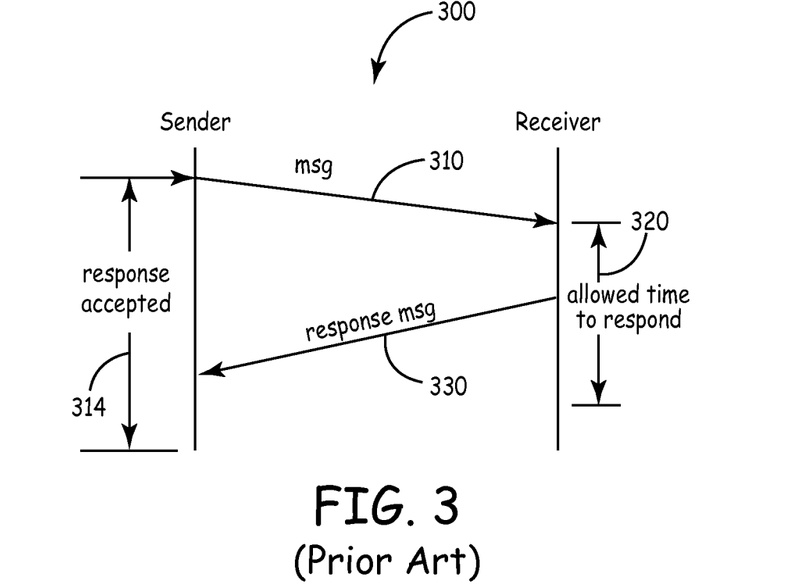
FIG. 3 is a timing diagram representing a conventional communication between a sender and a receiver without using a STANDBY message automatic response.
Figure 4:
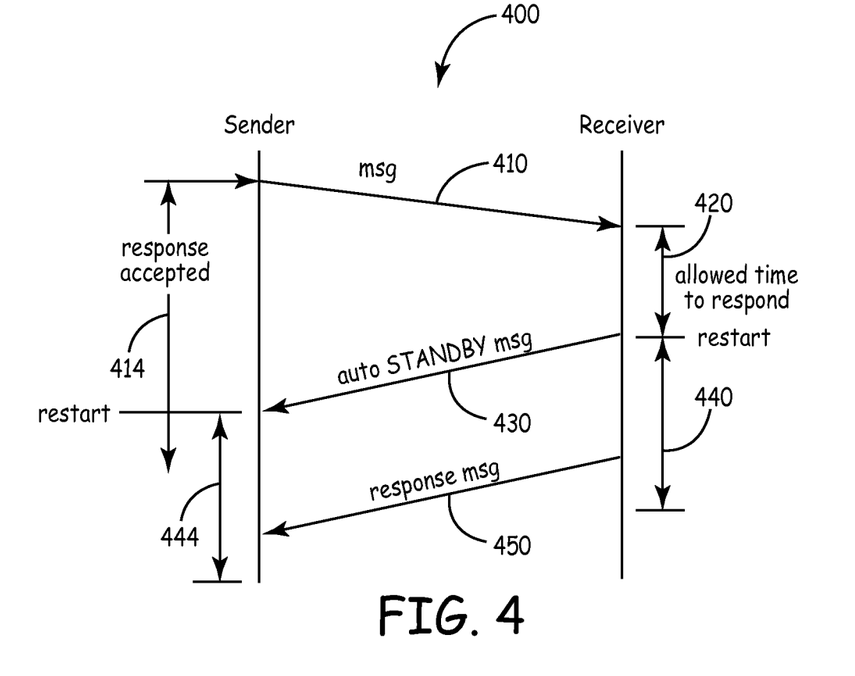
FIG. 4 is a timing diagram representing a communication between a sender and a receiver that uses the STANDBY message automatic response according to the invention.

FIGS. 3 and 4 are comparative representations of the timing allowed for responding to CPDLC messages in a conventional pilot/controller communication method (FIG. 3), and a pilot/controller communication method according to the invention (FIG. 4) that provides additional time for sending a response.

FIG. 3 depicts a timing diagram representing a communication method 300 between a sender (air traffic controller or pilot) and a receiver (pilot or air traffic controller) that does not use a STANDBY message automatic response. When a message (msg) 310 is transmitted by the sender, a sender timer is started that monitors a time period 314 to accept a response. The receipt of message 310 by the receiver starts a receiver timer that monitors an allowed time period to respond 320. The response message 330 needs to be sent back to the sender by the receiver before the time period to respond 320 expires or the response will be disabled. The response message 330 needs to be received by the sender before the time period 314 to accept a response expires or the response message will not be accepted by the sender computer.

FIG. 4 is a timing diagram representing a communication method 400 between a sender (air traffic controller or pilot) and a receiver (pilot or air traffic controller) that uses a STANDBY message automatic response according to the present invention. When a message (msg) 410 is transmitted by the sender, a sender timer is started that monitors a time period 414 to accept a response. The receipt of message 410 from the sender starts a receiver timer that monitors an allowed time period to respond 420. When an automatic STANDBY message 430 is sent after a predetermined timing threshold, the receiver timer is restarted to give the receiver an additional time period to respond 440. When the STANDBY message 430 is received by the sender, the sender timer is restarted to give the sender an additional time period to accept a response 444. A response message 450 needs to be sent back to the sender by the receiver before the additional time period to respond 440 expires or any subsequent response message will be disabled. The response message 450 needs to be received by the sender before the additional time period to accept a response 444 expires or the response message will not be accepted by the sender computer.

In an exemplary implementation of the method of the invention, it is assumed that a pilot has 100 seconds to respond to each CPDLC message. If the pilot has not responded to the CPDLC message within a specified time period (e.g., 80 s), then the avionics software automatically sends a STANDBY message to the air traffic controller. The pilot's workload is reduced and the pilot automatically gets additional time (e.g., 100 s) to respond, resulting in almost a doubling of the time period to respond (e.g., 80 s+100 s=180 s total time).

In another exemplary implementation of the method of the invention, it is assumed that an air traffic controller has 240 seconds to respond to each CPDLC message. If the air traffic controller has not responded to the CPDLC message within a specified time (e.g., 220 seconds), then the controller workstation software will automatically send a STANDBY message to the pilot. The air traffic controller's workload is thereby reduced and he or she automatically gets extra time (e.g., 240 s) to respond, resulting in almost a doubling of the time period to respond (e.g., 220 s+240 s=460 s total time).

Figure 5:
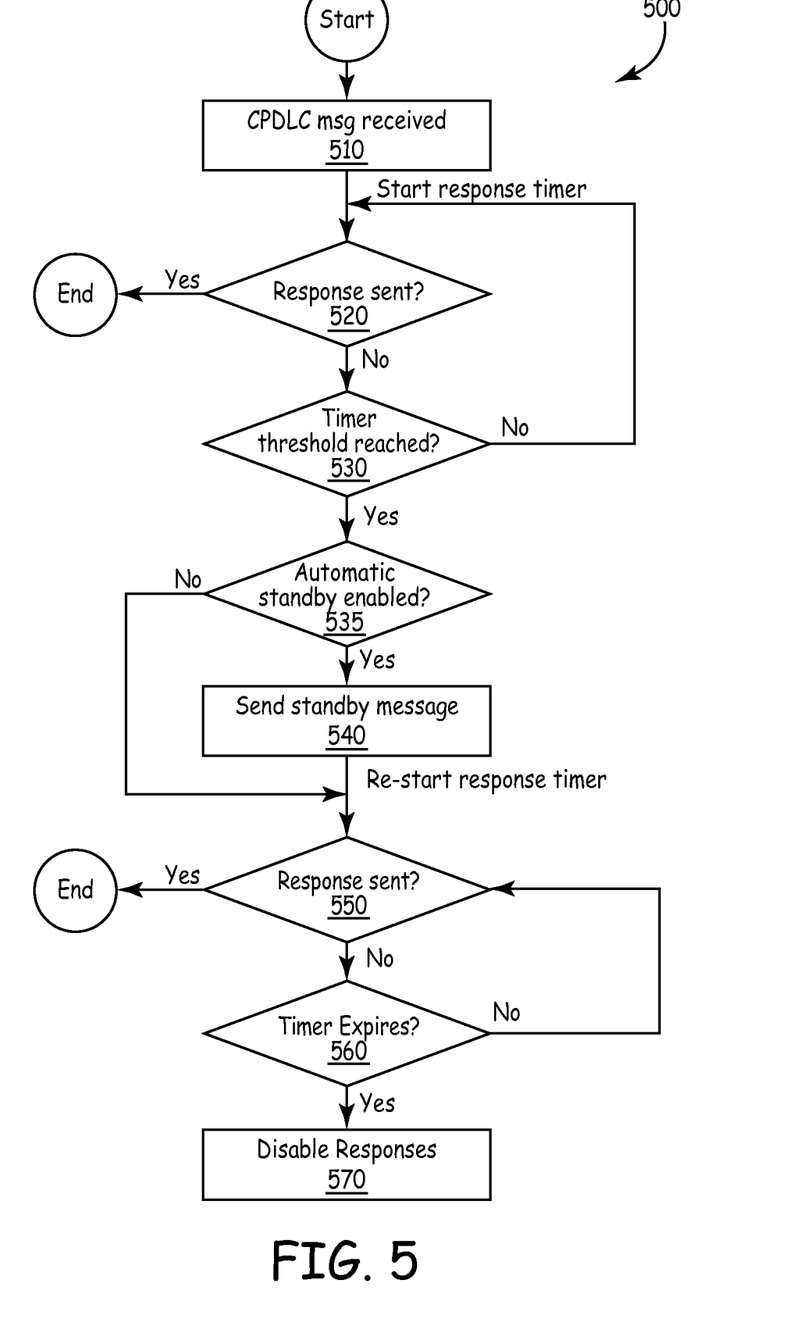
FIG. 5 is a flow diagram representing a method for automatically sending a STANDBY message response while an automatic standby mode is enabled.

FIG. 5 is a flow diagram representing another method 500 for communicating an automatic standby message in response to an electronic text message in a network, while an automatic standby mode is enabled. The method 500 starts when a text message such as a CPDLC message is received by a pilot or an air traffic controller (block 510). A response timer is then started for a first time period and a determination is made whether the pilot/controller has sent a response message (block 520). If the response message has been sent, the method ends. If the response message has not been sent, a determination is made whether the response timer has reached a predetermined timing threshold (e.g., 90% of time elapsed) (block 530). If not, method 500 continues to monitor whether a pilot/controller response message has been sent and whether the response timer has reached the threshold. When the timer reaches the predetermined timing threshold with the response message still not sent, a determination is made whether an automatic standby mode is enabled (block 535). If the automatic standby mode has been enabled, an automatic STANDBY message is transmitted (block 540) and the response timer is re-started for a second time period. If the automatic standby mode has not been enabled, the method 500 skips block 540. A determination is then subsequently made whether the pilot/controller has sent the response message (block 550) during the second time period. If the response message has been sent during the second time period, the method ends. If the response message has not been sent during the second time period, a determination is made whether the timer has expired (block 560). If not, method 500 continues to monitor whether a pilot/controller response message has been sent and whether the response timer has expired. If the response timer expires without the response message being sent, any subsequent response message is disabled (block 570).

The automatic standby mode can be enabled at any time before the determination is made whether an automatic standby mode is enabled at block 510. The automatic standby mode is enabled by the pilots and/or flight crew via a user interface attached to the computer system implementing the method described above. In example embodiments, the automatic standby mode is enabled for a fixed and predetermined period of time. In other embodiments, the period of time during which the automatic standby mode is enabled can be set by the pilot and/or flight crew when it is enabled. In example embodiments, once a pilot and/or flight crew chooses to send a STANDBY response on a particular message, the system may prompt the pilot and/or flight crew as to whether the automatic standby mode should be enabled at that time.

In example embodiments, the automatic standby mode does not apply to every type of message. The automatic standby mode would only automatically respond with STANDBY response messages to messages that required responses. Messages requiring responses include those requiring accept/reject, roger, affirmative/negative, or some report response. Messages requiring no response would not be affected by the automatic standby mode.

The predetermined timing threshold utilized in method 500 can be automatically varied as a function of network performance such as network response time. As described above, FIG. 2 is a flow diagram representing an exemplary method 200 for automatically varying the timing threshold for transmitting the automatic STANDBY message based on the timing of a round trip message between a sender computer and a receiver computer.

As described above, FIG. 3 depicts a timing diagram representing a communication method 300 between a sender (air traffic controller or pilot) and a receiver (pilot or air traffic controller) that does not use a STANDBY message automatic response, such as when the automatic standby mode is disabled in the method 500. Also described above, FIG. 4 depicts a timing diagram representing a communication method 400 between a sender (air traffic controller or pilot) and a receiver (pilot or air traffic controller) that uses a STANDBY message automatic response, such as when the automatic standby mode is enable in method 500.

The present method can be implemented as part of the CPDLC software in an air traffic control computer; in a communication management function (CMF) of a communication management unit (CMU); in a flight management computer (FMC) such as an FMC hosting CPDLC applications; or in any other avionics computer in an aircraft. The present method can be a part of the communication protocols for future air navigation system (FANS) CPDLC systems, or aeronautical telecommunication network (ATN) CPDLC systems.

Figure 6:
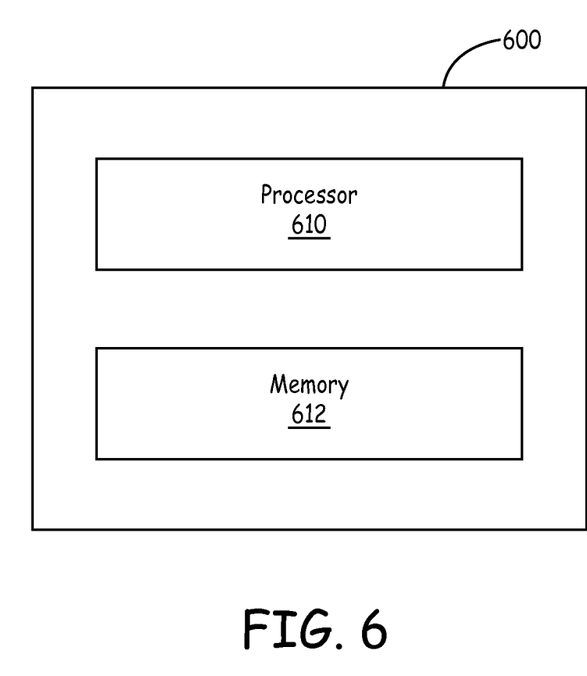
FIG. 6 is a block diagram of a computer system configured to implement a method according to one embodiment.

FIG. 6 depicts a computer system 600 configured to implement the present method. The computer system 600 includes at least one processor 610, and at least one memory device 612 in operative communication with processor 610. The processor 610 can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). In example embodiments, the processor 610 includes or functions with software programs, firmware, or other computer readable instructions for carrying out various process tasks, calculations, and control functions, used in the present methods. These instructions are typically tangibly embodied on the memory device 612, which may be any appropriate medium used for storage of computer readable instructions or data structures as described below.

The memory device 612 contains instructions for carrying out the various process tasks, calculations, and generation of signals and other data used in the operation of the methods of the invention. These instructions can be implemented in software, firmware, or other computer readable instructions. The memory device 612 may be any appropriate computer program product such as a computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs). Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, etc. that perform particular tasks or implement particular abstract data types. These represent examples of program code means for executing steps of the methods disclosed herein. The particular sequence of such executable instructions or associated data structures represent examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for communicating an electronic text message in a network, the method comprising:
   (a) receiving a text message;
   (b) starting a response timer for a time period to respond;
   (c) monitoring whether a response message has been transmitted;
   (d) if the response message has not been transmitted, determining whether the response timer has reached a predetermined timing threshold;
   (e) if the response timer has not reached the predetermined timing threshold, repeating steps (c) and (d);
   (f) if the response timer has reached the predetermined timing threshold without the response message being sent, determining whether an automatic standby message mode is enabled and whether the text message is of a type that requires a response;
   (g) if the automatic standby message mode is enabled and the text message is of a type that requires a response, automatically transmitting a standby message and restarting the response timer for the time period to respond;
   (h) monitoring whether the response message has been transmitted after the predetermined timing threshold is reached;
   (i) if the response message has not been transmitted in step (h), determining whether the response timer has expired;
   (j) if the response timer has not expired, repeating steps (h) and (i); and
   (k) if the response timer has expired without the response message being sent, disabling any subsequent response message from being sent.

2. The method of claim 1, further comprising:
   receiving an automatic standby message mode input.

3. The method of claim 1, wherein the text message is received by a pilot or an air traffic controller.

4. The method of claim 1, wherein the timing threshold is automatically varied as a function of network performance.

5. The method of claim 1, wherein the timing threshold is automatically varied based on a round trip message time between a sender computer and a receiver computer.

6. The method of claim 5, wherein the round trip message time is calculated as a difference between a message transmission time and a time of reception of an automatic acknowledgment from the receiver computer.

7. The method of claim 1, further comprising:
   setting a default value for the timing threshold;
   monitoring a round trip message time;
   determining whether the round trip message time is within a first range;
   if the round trip message time is within the first range, setting the timing threshold to a first value that is less than the default value, and continuing monitoring the round trip message time;
   if the round trip message time is not within the first range, determining whether the round trip message time is within a second range;
   if the round trip message time is within the second range, setting the timing threshold to a second value that is less than the first value, and continuing monitoring the round trip message time;
   if the round trip message time is not within the second range, determining whether the round trip message time is within a third range;
   if the round trip message time is within the third range, setting the timing threshold to a third value that is less than the second value, and continuing monitoring the round trip message time;
   if the round trip message time is not within the third range, determining whether the round trip message time is within a fourth range; and
   if the round trip message time is within the fourth range, setting the timing threshold to the default value, and continuing monitoring the round trip message time.

8. The method of claim 7, wherein:
   the default value is about 90% time elapsed;
   the first range is from greater than about 5 seconds up to about 10 seconds;
   the first value is about 80% time elapsed;
   the second range is from greater than about 10 seconds up to about 15 seconds;
   the second value is about 70% time elapsed;
   the third range is from greater than about 15 seconds up to about 20 seconds;
   the third value is about 65% time elapsed; and
   the fourth range is about 5 seconds or less.

9. The method of claim 1, wherein the method is implemented as part of communication protocols for a future air navigation controller pilot data link communication (CPDLC) system.

10. The method of claim 1, wherein the method is implemented as part of communication protocols for an aeronautical telecommunication network CPDLC system.

11. A computer system comprising:
    at least one processor; and
    at least one memory device in operative communication with the processor, the memory device comprising a computer readable medium having program instructions stored thereon executable by the processor to perform a method comprising:

receiving a text message;

starting a response timer;

monitoring whether a response message has been transmitted;

monitoring whether the response timer has expired;

if the response message has not been transmitted, determining whether the response timer has reached a predetermined timing threshold;

if the response timer has reached the predetermined timing threshold, determining whether an automatic standby message mode is enabled and whether the text message is of a type that requires a response;

if the automatic standby message mode is enabled and the text message is of a type that requires a response, automatically transmitting a standby message and restarting the response timer; and if the response timer has expired without the response message being sent, disabling any subsequent response message to the text message from being sent.

12. The computer system of claim 11, wherein the computer system comprises at least one of a flight communication management unit, a flight management computer, and an air traffic control computer.

13. The computer system of claim 11, wherein the text message is a CPDLC message.

14. The computer system of claim 11, further comprising: a user input device, wherein the automatic standby message mode is engaged through the user input device.

15. The computer system of claim 14, wherein the automatic standby message mode is engaged for a predetermined duration.

16. The computer system of claim 14, wherein the automatic standby message mode is engaged for a user determined duration.

17. A computer program product comprising a non-transitory computer readable medium having instructions stored thereon for a method of communicating an automatic standby message in response to an electronic text message, the method comprising:

(a) receiving a text message;

(b) starting a response timer for a time period to respond;

(c) monitoring whether a response message has been transmitted;

(d) if the response message has not been transmitted, determining whether the response timer has reached a predetermined timing threshold;

(e) if the response timer has not reached the predetermined timing threshold, repeating steps (c) and (d);

(f) if the response timer has reached the predetermined timing threshold without the response message being sent, determining whether an automatic standby message mode is enabled and whether the text message is of a type that requires a response;

(g) if the automatic standby message mode is enabled and the text message is of a type that requires a response, automatically transmitting a standby message and restarting the response timer for the time period to respond;

(h) monitoring whether the response message has been transmitted after the predetermined timing threshold is reached;

(i) if the response message has not been transmitted in step (h), determining whether the response timer has expired;

(j) if the response timer has not expired, repeating steps (h) and (i); and (k) if the response timer has expired without the response message being sent, disabling any subsequent response message from being sent.

18. The computer program product of claim 17, wherein the text message is a CPDLC message.

19. The computer program product of claim 17, wherein the method further comprises:

engaging the automatic standby message mode.

20. The computer program product of claim 17, wherein the text message is received by a pilot or an air traffic controller.

\* \* \* \* \*